(12) United States Patent
Mulet-Parada et al.

(10) Patent No.: US 7,519,206 B2
(45) Date of Patent: Apr. 14, 2009

(54) DETECTION OF FEATURES IN IMAGES

(75) Inventors: Miguel Mulet-Parada, Oxford (GB); Julia Alison Noble, Oxford (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 941 days.

(21) Appl. No.: 10/432,376

(22) PCT Filed: Nov. 19, 2001

(86) PCT No.: PCT/GB01/05094

§ 371 (c)(1),
(2), (4) Date: Jun. 13, 2003

(87) PCT Pub. No.: WO02/43004

PCT Pub. Date: May 30, 2002

(65) Prior Publication Data

US 2004/0047498 A1     Mar. 11, 2004

(30) Foreign Application Priority Data

Nov. 22, 2000   (GB) .................................. 0028491.9

(51) Int. Cl.
*G06K 9/00* (2006.01)
*G06K 9/46* (2006.01)
*G06K 9/40* (2006.01)
*A61B 5/05* (2006.01)
*A61B 8/00* (2006.01)

(52) U.S. Cl. ....................... 382/128; 382/190; 382/203; 382/260; 382/286; 600/407; 600/437

(58) Field of Classification Search ......... 382/128–132, 382/100, 190–192, 203, 260–265, 286; 600/407, 600/437–444

See application file for complete search history.

(56) References Cited

U.S. PATENT DOCUMENTS 4,746,910 A * 5/1988 Pfister et al. ................. 340/567

(Continued)

FOREIGN PATENT DOCUMENTS

EP        0 196 044        10/1986

(Continued)

OTHER PUBLICATIONS

Jacob, Gary, I. Alison Noble, Miguel Mulet-Parada, and Andrew Blake. "Evaluating a Robust Contour Tracker on Echocardiographic Sequences": 1999. Oxford University Press. Medical Image Analysis. vol. 3, No. 1, pp. 63-75.*

(Continued)

*Primary Examiner*—Matthew C Bella
*Assistant Examiner*—Manav Seth
(74) *Attorney, Agent, or Firm*—Nixon & Vanderhye PC

(57) ABSTRACT

An image processing technique which identifies pixels in images which are associated with features having a selected shape, such as but not exclusively step edge, roof, ridge or valley. The shape of the intensity profile in the image is compared in an intensity independent way with a shape model to select those pixels which satisfy the shape model and are thus associated with the feature of interest. This comparison is achieved by examining the phase and amplitude of a spectral decomposition of parts of the image profile in the spatial or spatio temporal frequency domain. This decomposition can be achieved using quadrature wavelet pairs such as log-Gabor wavelets. The difference between the odd and even components, known as the feature asymmetry, gives an indication of the shape of the feature. The analysis may be extended to the time domain by looking at the shape of the image profile across a time sequence of images, which gives an indication of the velocity of a moving feature. Pixels identified as belonging to a feature of the right shape are labelled with the value of feature asymmetry, the local amplitude, feature orientation and feature velocity, and this information can be used to improve the tracking of detected features through a sequence of images.

23 Claims, 7 Drawing Sheets

U.S. PATENT DOCUMENTS

| | | | |
|---|---|---|---|
| 4,760,548 A | | 7/1988 | Baker et al. |
| 4,768,516 A | * | 9/1988 | Stoddart et al. ............. 600/474 |
| 4,907,288 A | | 3/1990 | Shimoni |
| 4,941,474 A | * | 7/1990 | Pratt, Jr. ...................... 600/437 |
| 5,054,045 A | | 10/1991 | Whiting et al. |
| 5,090,042 A | | 2/1992 | Bejjani et al. |
| 5,166,969 A | | 11/1992 | Heidsieck |
| 5,214,382 A | | 5/1993 | Harms et al. |
| 5,293,574 A | | 3/1994 | Roehm et al. |
| 5,435,310 A | | 7/1995 | Sheehan et al. |
| 5,546,476 A | | 8/1996 | Mitaka et al. |
| 5,553,111 A | | 9/1996 | Moore et al. |
| 5,633,951 A | | 5/1997 | Moshfeghi |
| 5,669,382 A | | 9/1997 | Curwen et al. |
| 5,677,707 A | * | 10/1997 | Abe et al. .................... 345/635 |
| 5,710,841 A | | 1/1998 | Green et al. |
| 5,718,241 A | * | 2/1998 | Ben-Haim et al. .......... 600/515 |
| 5,757,880 A | | 5/1998 | Colomb |
| 5,760,403 A | | 6/1998 | Elabd |
| 5,785,656 A | * | 7/1998 | Chiabrera et al. ........... 600/449 |
| 5,825,936 A | | 10/1998 | Clarke et al. |
| 5,850,370 A | * | 12/1998 | Stringer et al. .............. 367/128 |
| 5,871,019 A | * | 2/1999 | Belohlavek .................. 600/450 |
| 6,157,677 A | | 12/2000 | Martens et al. |
| 6,346,124 B1 | * | 2/2002 | Geiser et al. ................. 600/450 |
| 6,360,027 B1 | * | 3/2002 | Hossack et al. ............. 382/294 |
| 6,585,647 B1 | * | 7/2003 | Winder ........................ 600/437 |
| 6,611,615 B1 | | 8/2003 | Christensen |
| 6,625,330 B1 | * | 9/2003 | Dubey et al. ................ 382/293 |
| 6,643,387 B1 | * | 11/2003 | Sethuraman et al. ........ 382/107 |
| 6,716,175 B2 | * | 4/2004 | Geiser et al. ................. 600/450 |
| 6,738,499 B1 | | 5/2004 | Doi et al. |
| 6,757,423 B1 | | 6/2004 | Amini |
| 6,760,486 B1 | * | 7/2004 | Chiao et al. ................. 382/274 |
| 7,043,063 B1 | * | 5/2006 | Noble et al. ................. 382/128 |
| 7,260,248 B2 | * | 8/2007 | Kaufman et al. ............. 382/128 |
| 2004/0047498 A1 | | 3/2004 | Mulet-Parada et al. |
| 2004/0094167 A1 | | 5/2004 | Brady et al. |

FOREIGN PATENT DOCUMENTS

| | | |
|---|---|---|
| EP | 0 532 823 | 3/1993 |
| EP | 0 698 855 A | 2/1996 |
| EP | 0 788 070 | 8/1997 |
| GB | 2 268 351 | 1/1994 |
| WO | 95/26539 | 10/1995 |
| WO | 01/16886 A2 | 3/2001 |

OTHER PUBLICATIONS

Gustavsson, T., R. Abu-Gharbieh, G. Hamarneh, and Q. Liang. "Implementation and Comparison of Four Different Boundary Detection Algorithms for Quantitative Ultrasonic Measurements of the Human Carotid Artery": 1997. IEEE Computers in Cardiology. vol. 24.*

Detmer, Paul. R, G. Bashein, Roy W. Martin, and The Study of Perioperative Ischemia Research Group. "Matched Filter Identification of Left-Ventricular Endocardial Borders in Transesophageal Echocardiograms": 1990. IEEE Transations on Medical Imaging. vol. 9, No. 4, pp. 396-404.*

Jianzin Hou et al; "Orientation Selective Operators for Ridge, Valley Edge, and Line Detection in Imagery"; Proceedings of the International Conference on Acoustics, Speech and Signal Processing (ICASSP). I. Image and Multidimensional Signal Processing. Adelaide, Apr. 19-22, 1994, New York, IEEE, US, vol. 5, Conf. 19, Apr. 19, 1994, pp. V-25-V-28, XP000533688.

Vega-Riveros et al; "Review of Motion Analysis Techniques"; IEE Proceedings I. Solid-State & Electron Devices, Institution of Electrical Engineers, Stevenage, GB, vol. 136, No. 6, Part 1, Dec. 1, 1989, pp. 397-404, XP000080261.

Cucchiara et al; "Detection of Luminosity Profiles of Elongated Shapes"; Proceedings of the International Conference on Image Processing (ICIP) Lausanne, Sep. 16-19, 1996, New York, IEEE, US, vol. 1, Sep. 16, 1996, pp. 6350638, XP010202474.

"Intensity-invariant 2D+T Acoustic Boundary Detection" is from the Workshop on Biomedical Image Analysis, Jun. 26-27, 1998, Santa Barbara, California.

Intensity-invariant 2D+T Acoustic Boundary Detection is from the Proceedings of Medical Image Understanding and Analysis 98, University of Leeds, Jul. 6-7, 1998.

"2D+T Acoustic Boundary Detection in Echocardiography" is from Medical Image Computing and Computer-Assisted Intervention—MICCAI'98 First International Conference Cambridge, MA, USA, Oct. 1998 Proceedings, printed in Lecture Notes in Computer Science, edited by William M Wells, Alan Colchester and Scott Delp.

Moody E.B.: "Discrete Orthogonal Polynomial Restoration of Images Degraded by Spatially Varying Point Spread Functions", Proceedings of the International Conference on Image Processing (ICIP), US, Los Alamitos, IEEE Comp. Soc. Press, pp. 680-684.

Mitsuo Ohta et al,: "A Restoration and Method of Medical X-Ray Images Based on an Extended Regression Analysis Method", Systems & Computers in Japan, US, Scripta Technia Journals. New York, vol. 22, No. 13, Jan. 1, 1991, pp. 104-116.

J. A. Seibert et al: "Removal of Image Intensifier Veiling Glare by Mathematical Deconvolution Techniques", Journal of Medical Physics, vol. 13, No. 3, May/June 185.

Highnam et al. "Computing the Scatter Component of Mammographic", IEEE Transactions on Medical Imaging, vol. 13, No. 2., Jun. 1994, pp. 301-313.

Rangaraj M. Rangayyan et al: "Parabolic Modelling and Classification of Breast Tumors", Intl. Journal of Shape Modelling, vol. 3, No. 3-4, Sep.-Dec. 1997, pp. 155-156.

Inspec Abstract Accession No. 6398151, Muller et al, Feb. 22, 1999.

McEachen JC II et al; "Shape-Based Tracking of Left Ventricular Wall Motion"; IEEE Transactions on Medical Imaging, Jun. 1997, vol. 16, No. 3, pp. 270-283, XP002155446.

Setarehdan SK et al; "Automatic Left Ventricular Feature Extraction and Visualisation From Echocardiographic Images"; Computers in Cardiology, 1996, pp. 9-12, XP000687747.

Jacob G et al; "Robust Contour Tracking in Echocardiographic Sequences" Sixth International Conference on Computer Vision (IEEE Cat. No. 98CH36271), Processing of IEEE 6th International Conference on Computer Vision, Bombay, Jan. 4-7, 1998; pp. 408-413, XP002155450.

Chalana V et al; "A Multiple Active Contour Model for Cardiac Boundary Detection on Echocardiographic Sequences"; IEEE Transactions on Medical Imaging, vol. 15, No. 3, Jun. 1, 1996, pp. 290-298, XP000587923.

Strickland et al., Computing Correspondence in a Sequence of Non-Rigid Shapes, Pattern Recognition, Pergamon Press Inc., Elmsford, NY, vol. 25, No. 9, Sep. 1, 1992, pp. 901-912.

Cham et al., "A Statistical Framework for Long-Range Feature Matching in Uncalibrated Image Mosaicing", Computer Vision and Pattern Recognotion, Proceedings 1998 IEEE Computer Society Conference on Jun. 23-25, 1998, pp. 442-447.

Foley et al.; "Interpolation with Interval and Point Tension Controls Using Cubic Weighted v-Splines"; ACM Transactions Mathematical Software, vol. 13, No. 1, Mar. 1987, pp. 68-96.

* cited by examiner

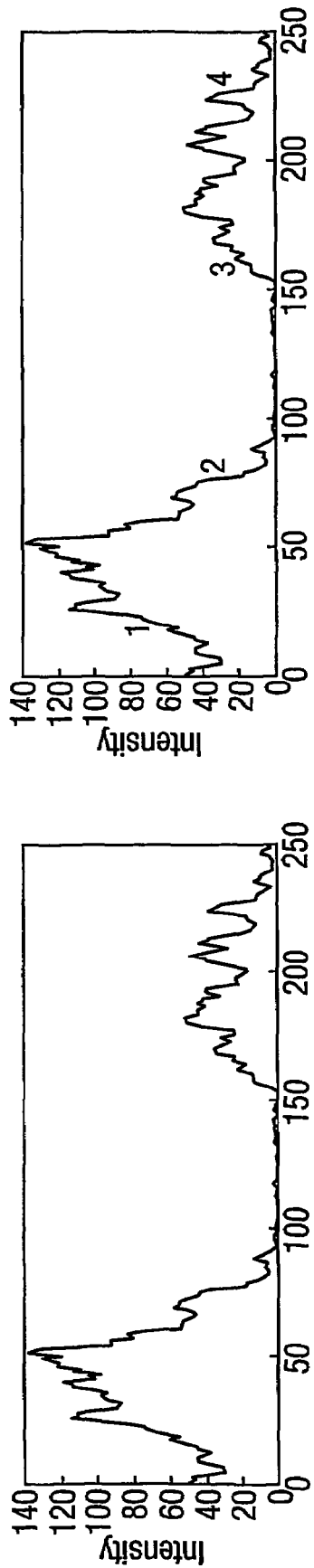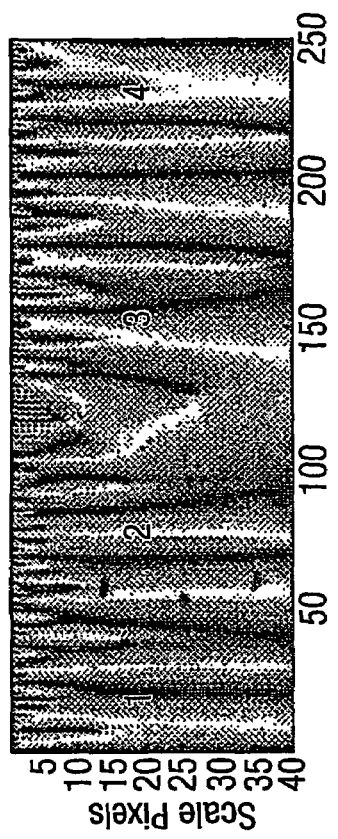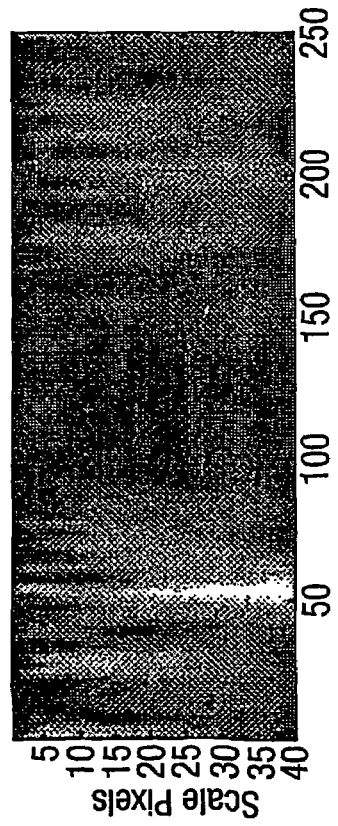
Fig.5(A).
Fig.5(B).
Fig.5(C).

DETECTION OF FEATURES IN IMAGES

This application is the U.S. national phase of international application PCT/GB01/05094 filed 19 Nov. 2001, which designated the U.S.

BACKGROUND AND SUMMARY

The present invention relates to a method and apparatus for processing images to detect particular features in the image. It is particularly concerned with the detection of features in noisy 2D, 2D+T, 3D and 3D+T images, and is thus particularly useful in medical imaging, for instance using ultrasound.

There are a variety of techniques for processing images to enhance them, particularly to reduce the amount of noise and/or to detect features of interest in the image. Such techniques are particularly useful in areas where images are noisy, for instance in medical imaging. For example, ultrasound images include a considerable amount of speckle which makes images difficult to interpret. Skilled operators are able to interpret such images based on their experience and knowledge of the features of interest likely to be present. However, automating the process of detecting features of interest is made difficult by the presence of noise and imaging artefacts. Similar problems arise in other imaging techniques, such as magnetic resonance imaging.

In general up to now techniques proposed for enhancing images have been based on examining the intensity of the image, for instance by smoothing the intensity to reduce noise or by setting a detection threshold based on amplitude. However, techniques based on thresholding are not entirely satisfactory because of the difficulty of setting a suitable global threshold. For instance, ultrasound images include attenuation artifacts caused by the changing orientation and reflectivity of the tissue being imaged. Choosing one threshold which is suitable for excluding noise, but including all features of interest, is difficult if not impossible.

Other techniques have been proposed for analysing noisy images for detecting features which are based on correlating images over time or with movement of the imaging probe. For instance, ultrasound speckle decorrelates with movement of the probe and over time. A problem with some of these techniques, however, is that they tend to blur the features of interest in the image. Thus the user has to accept to trade-off between removing noise and losing image quality.

It is therefore an object of the invention to provide a technique for automatic detection of features of interest in an image which improves on the prior art techniques.

The present invention provides a method for detecting features of interest in an image based on the shape of the intensity profile of the feature, rather than its intensity. This is achieved by an intensity independent comparison of the intensity profile across the image with a shape model of features of interest. To improve subsequent processing of the image, areas of the image which are detected as corresponding to the shape model are labelled with a description of their properties.

In more detail, therefore, the present invention provides a method of detecting features-of-interest in an image, comprising the steps of:

making an intensity independent comparison of the shape of regions of the intensity profile across the image with a shape model for predefined features of interest to define as features of interest areas of the image satisfying the shape model; and storing for each of said defined areas a label comprising the level of similarity to the shape model.

The predefined features of interest may be positive and negative step edges, or roof or ridge shapes, or valleys or other features as desired depending on the application.

The label may include a measure of the orientation of the feature in the image, and the comparison may also be performed on an intensity profile taken across successive frames of an image sequence to derive a measure of the velocity of image features. The label may then comprise a measure of the velocity.

The comparison with the shape model is advantageously performed in the spatial or spatio temporal frequency domains, thus by decomposing the intensity profile into spatial frequency components and examining the phase and amplitude of those components. In one embodiment this is achieved by convolving the intensity profile with a quadrature filter to derive the phase and amplitude of a pair of odd and even components of the profile in the spatial frequency domain. The phase and amplitude of these components is characteristic of different shapes in the intensity profile. The difference between the odd and even components, which is a measure of the "feature asymmetry" is, for example, a maximum for a step edge. Thus by setting constraints on the value of the feature asymmetry it is possible to determine that the area of the image under consideration corresponds to the shape being sought. The values of feature asymmetry and local amplitude (which is based on the amplitude of the two components), are included in the label.

Preferably the filters are quadrature wavelet filters, e.g. log-Gabor filters, so that the intensity profile is convolved with odd and even wavelets. The scale of the wavelet is chosen in accordance with the scale of the features to be detected, and to be much larger than the scale of noise in the image. This means that the technique selects features according to their shape and scale, but regardless of the value of intensity.

The filters may be oriented in different directions across the image to detect image features having different orientations. The label may then include a measure of the feature orientation, which can be derived from the relative responses of the differently oriented filters.

The image processing technique of the invention may be used as a precursor to tracking detected image features through a sequence of image frames. The provision of the labels carrying information about the detected features is particularly useful in such a tracking process. For instance, rather than simply searching for the closest image feature in two successive frames, it is possible also to compare the labels of the detected image features in the two frames and to define them as relating to the same image feature if the labels satisfy predefined search criteria.

Such search criteria may include a condition on the value of the feature asymmetry of the two features being detected and a condition on the orientation of the detected features (for instance that they are oriented similarly).

Where the label includes a measure of the velocity of the feature, the search area from frame-to-frame may be defined in accordance with the velocity, and the search criteria may include a condition on the velocity.

The invention is particularly applicable to ultrasound or magnetic resonance images, but also to x-ray and other imaging modalities. The embodiment described below relates to echocardiography, but the invention is applicable to ultrasound images in general, such as of different organs and tissues e.g. coronary arteries, liver, foetus etc, and to different ultrasound modalities such as the use of contrast and different signal processing techniques such as Doppler imaging and harmonic imaging. For instance in echocardiography, by setting the shape model appropriately the invention is adaptable to the detection of any features corresponding to a step change in intensity, such as the ventricular walls.

The invention may be embodied in a system adapted to perform the image processing method, and it may be embodied by a computer program comprising program code means for executing the method. Thus the invention further provides for a computer program storage medium carrying such a computer program, and also a computer system programmed to carry out the method.

BRIEF DESCRIPTION OF THE DRAWINGS

The invention will be further described by way of example with reference to the accompanying drawings in which:—

FIG. 5(a) illustrates a typical intensity profile across an ultrasound image;

FIG. 5(b) illustrates the local amplitude result of a convolution of an intensity profile with log-Gabor filters at a succession of scales;

FIG. 5(c) illustrates the local phase result of a convolution of an intensity profile with log-Gabor filters at a succession of scales;

DETAILED DESCRIPTION OF EXAMPLE EMBODIMENTS

Figure 1A:
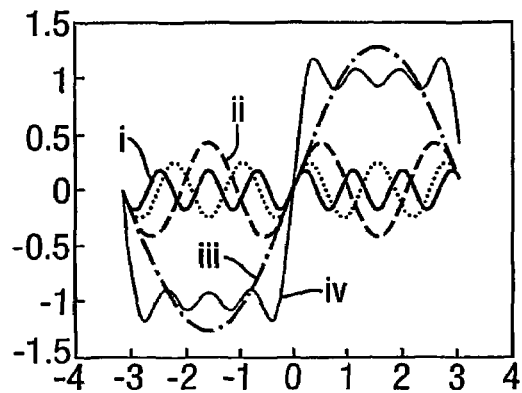
FIGS. 1(a) and (b) illustrate Fourier decompositions of a step edge and a triangular function.
Figure 1B:
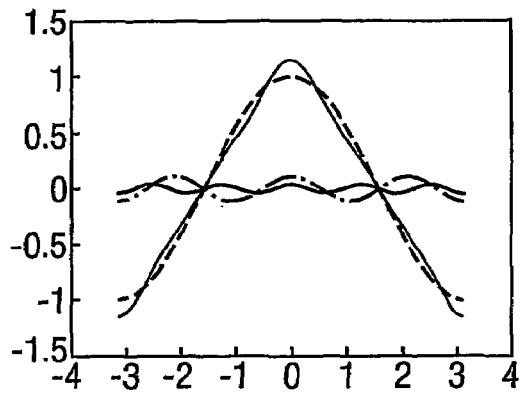

While traditional methods for detection of a step edge in an intensity profile rely on examining the derivatives of the intensity profile (i.e. its slope), to detect the sudden changes in intensity which mark the visible edge of features in the image, this embodiment of the invention examines a decomposition of the intensity profile in the spatial or spatio temporal frequency domains. For instance, FIG. 1 illustrates Fourier decompositions of a step edge (FIG. 1(a)) and a triangular function (FIG. 1(b)). In FIG. 1(a) it can be seen that three sinusoidal components i, ii and iii sum to make an approximation to a step edge iv. Further it will be noted that the phase of all three components is the same, zero, at the positive-going step edge. Further the phase value of all the components at the negative step edge is 180 degrees. Reference to FIG. 1(b) illustrates that for a triangular peak the phase value of all of the Fourier components is 90 degrees at the peak of the triangle.

Figure 2:
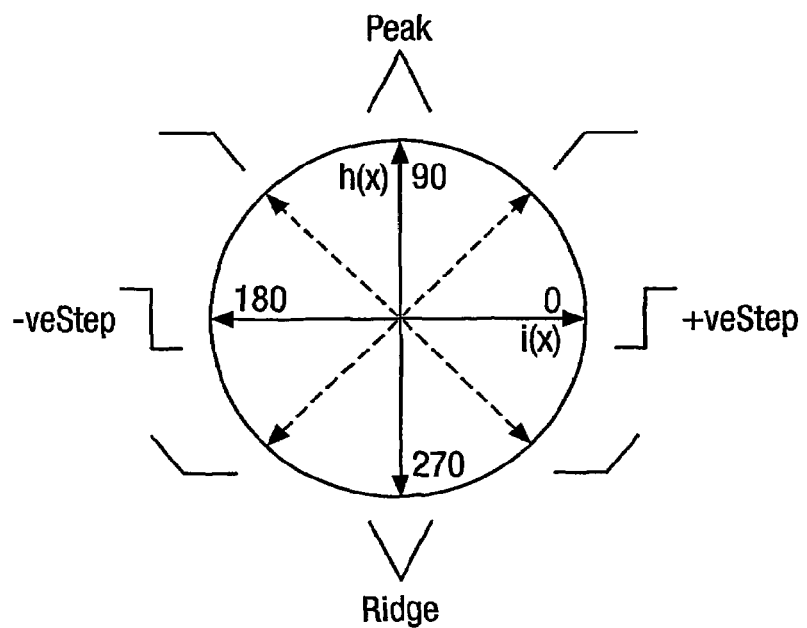
FIG. 2 illustrates the values of the local phase signatures of spatial frequency components for different functions.

The "local phase" is defined as the phase offset of each Fourier component describing a signal, measured at the event of interest. For features such as a step, the peak of a roof or the foot of a ramp, the local phase of all of the Fourier components converges to the same value. Further, the value is characteristic of the type of feature. The phase values for different types of feature is illustrated in the diagram of FIG. 2. It can be seen, therefore, that the phase of the spectral components of a signal gives an indication of the shape of the signal. It should be noted that the particular value of phase is arbitrary (depending on the position of the origin), what is important is that the different features have different, known values.

Figure 3A:
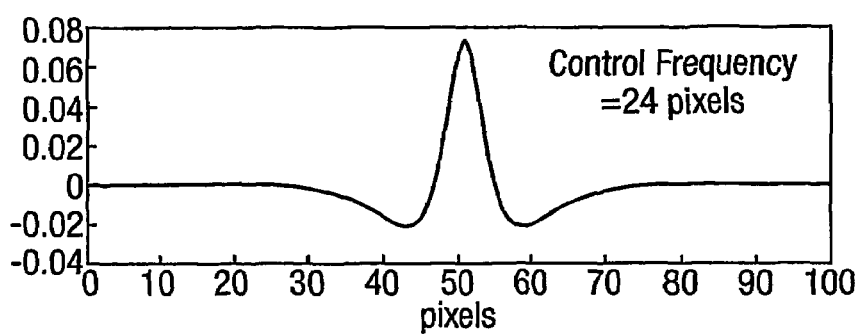
FIGS. 3(a) and (b) illustrate respectively even and odd two-octave log-Gabor wavelet functions.
Figure 3B:
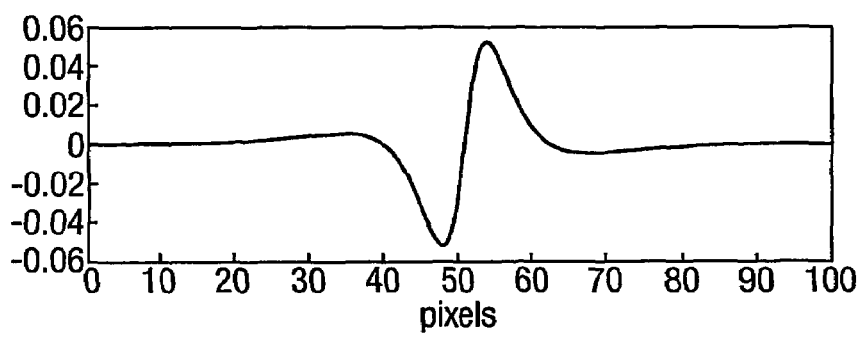
Figure 4:
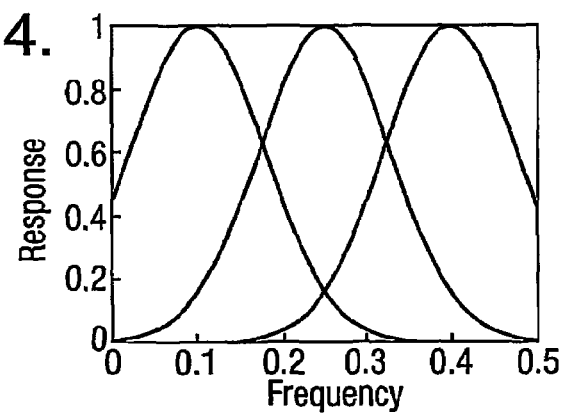
FIG. 4 illustrates the spectral properties of the log-Gabor wavelets.
Figure 4:
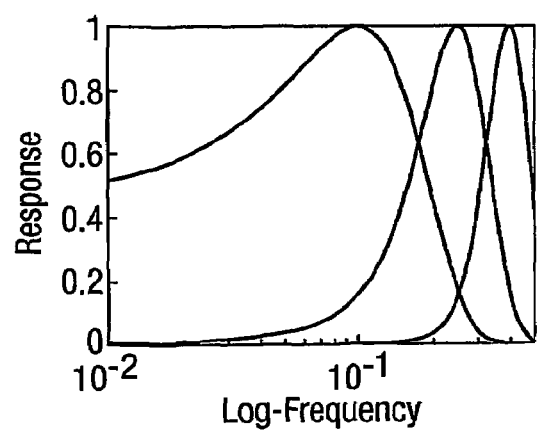

While Fourier decomposition might be suitable for perfectly shaped features, the intensity profile across typical images is much more complex and noisy and a Fourier decomposition of such a complex waveform would be extremely complex. Instead, this embodiment of the invention looks in turn at successive small sections of the intensity profile across the image by making the spectral analysis using wavelets. This embodiment uses log-Gabor wavelets as illustrated in FIG. 3 (which are in fact Gaussian modulated sinusoids) which have a non-zero central section and are zero elsewhere. Thus convolving them with the intensity profile effectively windows a small region of the profile. FIG. 3(a) shows the even wavelet based on a Gaussian modulated cosine, and FIG. 3(b) the odd wavelet based on a Gaussian modulated sine function. The spectral properties (plotted against frequency and log-frequency) of the wavelets are shown in FIG. 4.

Thus just as a Fourier analysis of a profile gives the amount and phase of each of the Fourier components, convolving the intensity profile with the log-Gabor wavelet pair extracts the amplitude and phase of the odd and even components for the region of interest.

The scale of the wavelets used is important. FIG. 5(a) illustrates a typical intensity profile across an echocardiographic image. One can imagine analysing this profile using very small scale versions of the wavelets shown in FIGS. 3(a) and 3(b). This would result in an analysis of the very small scale variations in intensity in the profile. On the other hand, if the scale of the wavelets used was much larger, such that, for example, only one wavelet fitted across the entire length of the profile, the effect of the small scale variations in intensity would not affect the result, and the analysis would only actually pick up the broad overall shape of the profile. Thus the effect of varying the scale of the wavelet is to look for different scale features in the profile.

The effect of varying the wavelength, or scale, of the wavelet is illustrated by the scalograms of FIGS. 5(b) and (c). These scalograms are constructed by taking the convolutions of a sequence of log-Gabor filters of increasing wavelength, and stacking vertically the output local phase or local amplitude responses of each filter, so that each forms a new row of the image. The scalograms on the left (FIG. 5B) are computed from the local amplitude responses given by $$A(x) = \sqrt{o^2(x) + e^2(x)}$$

where e(x) is the output of the even log-Gabor wavelet, and o(x) is its odd counterpart. Similarly, the phase scalogram of FIG. 5B is computed from the absolute local phase values given by:

$$\Phi(x) = \left\| \arctan\left(\frac{e(x)}{o(x)}\right) \right\|$$

On the left scalogram, the intensity values correspond to the output amplitudes of the convolutions. The phase values on the right have been mapped to intensities so that black corresponds to zero phase (positive steps) and white corresponds to π radians (negative steps). Peaks, having π/2 phase signatures, are grey.

The phase scalogram shows that at small scales many features corresponding to these extreme values are found. However, as the filter scale increases, the number of features reduces to a few straight bands. Among these it is possible to identify the step edges (local phase converges to zero, thus black on the scalogram) corresponding to the epicardial (1) and the endocardial (2,3) step edges, as well as a pericardial peak (4). From the phase scalogram such as FIG. 5c, two observations can be made: 1) features such as step edges and peaks have stable phase values and 2) phase signatures remain localised over scales. Stability means that there is always a particular phase signature associated with each feature shape over scales (in the illustration the zero degree and π radian values corresponding to positive and negative steps respectively are shown). Localisation means that the local phase signature associated with a feature remains in the proximity of the event (i.e. at the same place on the x-axis) over a range of scales. Thus because localisation and stability hold, it is possible to identify features of interest from the phase output of a large scale convolution according to pre-defined phase signatures, and trace these back along straight paths to their location. Thus the system can use a large scale filter to remove noise and still identify feature points accurately, and by examining a phase scalogram such as FIG. 5(c) it is possible to set a suitable scale at which the phase signatures of features of interest are clear.

In the present embodiment of the invention a single scale is sufficient to detect echo boundaries of interest corresponding to the heart. In different applications, such as viewing different organs or using different modalities it may be necessary to combine the output of the filters at different scales to enhance the detection. If necessary filters may be run at different scales and the results of different scales combined by, for example, averaging feature asymmetry results and recording selected features if their shape description is consistent over a number of scales.

In this embodiment of the present invention the images being processed are echocardiograms of the left ventricle obtained using an HP-Sonos 5500 scanner producing images of a size 300×250 pixels at a frame rate of 50 to 60 Hz. For these images scales of between 32 to 56 pixel are used with log-Gabor wavelets of two octaves.

So far, the issue of boundary detection has been centred on the 1D problem and the analysis of a 1D profile. However, the present invention is also designed to detect and find the orientation of features (steps, valleys, ridges) in 2D image and 3D volume data (including 2D+T i.e. sequence data).

To do this a filter bank of oriented filters is designed to sample the space of the data: i.e. a plane for a 2D image or a volume for 3D or 2D+T data. This embodiment of the invention has been applied to echocardiographic sequences, and in this case a 2D+T volume is created by stacking the successive image frames behind each other creating a 3D volume (such that the two spatial dimensions follow the x and y axes and the time dimension follows the z axis). A volume for three spatial dimensions (3D) is created by stacking images taken at different depths.

Sampling of multidimensional data and detection of feature orientation require:

1. the extension of log-Gabor filters to higher dimensions (2D and 3D),
2. the choice of optimal orientations for the filters in the 2D and 3D spaces, and
3. an interpolation method that allows estimation of the orientation of the features detected from a small number of filter responses.

Extending a 1D filter function to higher dimensions is called 'spreading'. In this embodiment the log-Gabor filters are spread to higher dimensions by multiplying with a Gaussian function in the spectral domain. For example in 2D $$G(\omega_r, \phi) = \exp - \left( \frac{(\log(\omega_r/\omega_{r0}))^2}{2(\log(\kappa/\omega_{r0}))^2} + \frac{(\phi - \phi_0)^2}{2\sigma_\phi^2} \right)$$

Here $\sigma_\phi$ defines the extent of the spreading function as a scaling s of the separation between filters $\sigma_{100} = s \times \Delta\phi$. This spreading concept can, of course, be extended to 3D.

Figure 7A:
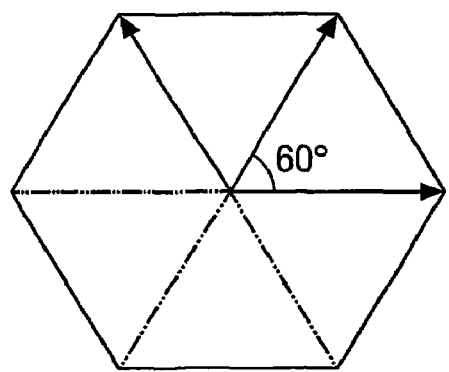
FIGS. 7 (A) and (B) illustrate examples of the feature orientations in two and three dimensions used in the embodiment of FIG. 6.

The number of filters and their particular orientations have to be defined such that all possible features of interest are detected and their direction estimated reliably. In the absence of prior knowledge on the expected orientation of the features, this requires evenly sampling the data space with sufficient filters, so that an interpolation procedure can estimate the orientation of the feature accurately. In this embodiment three evenly spaced filters in 2D and six evenly spaced filters in 2D+T provide good accuracy while minimising the number of filtering operations required. These are illustrated in FIGS. 7(A) and (B) respectively.

Various interpolation algorithms can be used; in this embodiment, the filter responses are interpolated by using an elliptic (2D) or ellipsoidal (3D) fit to the filter responses. This approximation provides estimates of feature orientation within the accuracy required by the tracking algorithm.

Estimation of feature orientation in a 2D+T volume is equivalent to finding the orientation and direction of movement of a feature. If one imagines a horizontal line moving upwards over a sequence of images, then it will appear in the frame stack as a plane with a given inclination to the horizontal proportional to the speed of the line. A fast line will become a steep plane; a slower line would be less steep. Estimating this component of feature orientation is equivalent to estimating feature velocity.

This can be used to anticipate the motion of anatomical boundaries and is of great benefit for subsequent tracking stages.

This embodiment of the invention is particularly applicable to the detection of anatomical boundaries such as heart chamber boundaries and in particular ventricular boundaries in the echocardiographic image of the left ventricle. These are step edges in intensity. In this embodiment such step edges are detected by deriving the "feature asymmetry" which is a measure of the difference between the odd and even filter outputs at each point in the image and is a function of the phase signature. Thus rather than looking at the value of the local phase as defined above, it is the feature asymmetry which is derived and this can be defined as:—

$$FA(x) = \frac{|o(x)| - |e(x)|}{\sqrt{e^2(x) + o^2(x)}}$$

where o(x) and e(x) are the odd and even filter outputs at point x in the 2D image or 2D+T volume.

The feature asymmetry is directly related to the local phase in the following way:—

$$FA(x) = |\sin(\Phi(x))| - |\cos(\Phi(x))|$$

where $\Phi$ is the local phase.

Figure 11:
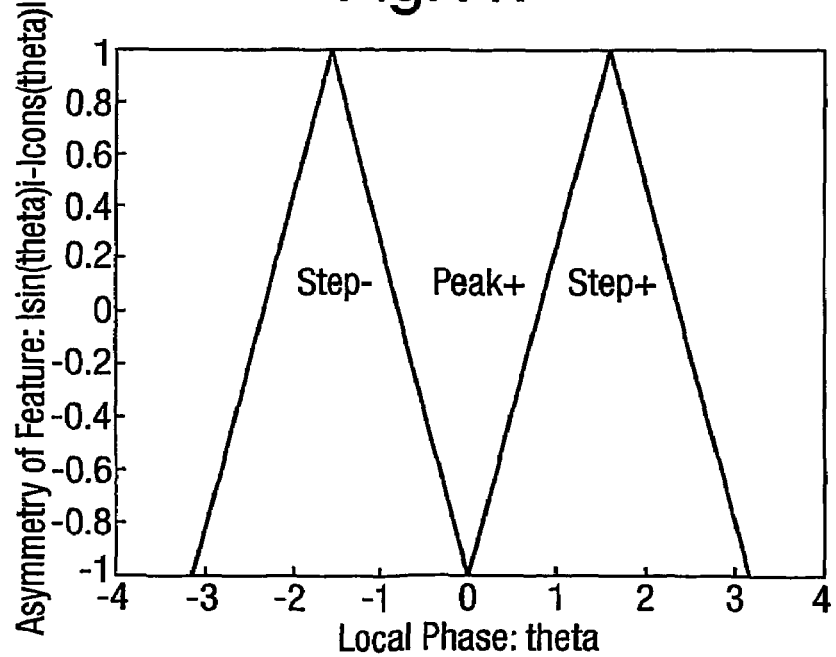
FIG. 11 illustrates the relationship between local phase and feature asymmetry.

This function is plotted in FIG. 11. It can be seen that the feature asymmetry varies almost linearly with local phase ranging from −1 for peaks and valleys to +1 for positive and negative steps. (It should be noted that the phase values for FIG. 11 and the embodiment below are offset by 90° from those shown in FIGS. 1 and 2. If the zero phase point had been defined as in FIGS. 1 and 2, then FIG. 11 would simply be inverted, with FA=−1 for positive and negative steps (at 0° and 180°) and +1 for peaks and valleys (at 90° and 270°).)

With this embodiment of the present invention, therefore, it is the feature asymmetry which is calculated and thresholded to detect positive and negative steps. For instance, a threshold of 0.9 for the feature asymmetry corresponds to a local phase range of ±5 degrees around ±90 degrees and will thus detect positive and negative steps. The exact value of the threshold affects the width of the detected features. The threshold is dimensionless and thus can be applied to any image to detect the edges that fall within the scale of the filters. Noise rejection is thus solely a matter of scale and feature shape, not intensity. Thus by deciding whether or not image points belong to a particular feature on the basis of feature asymmetry means that the technique is independent of the intensity of the image points. Of course the intensity can be noted and used in later processes, such as tracking as explained below.

Figure 8:
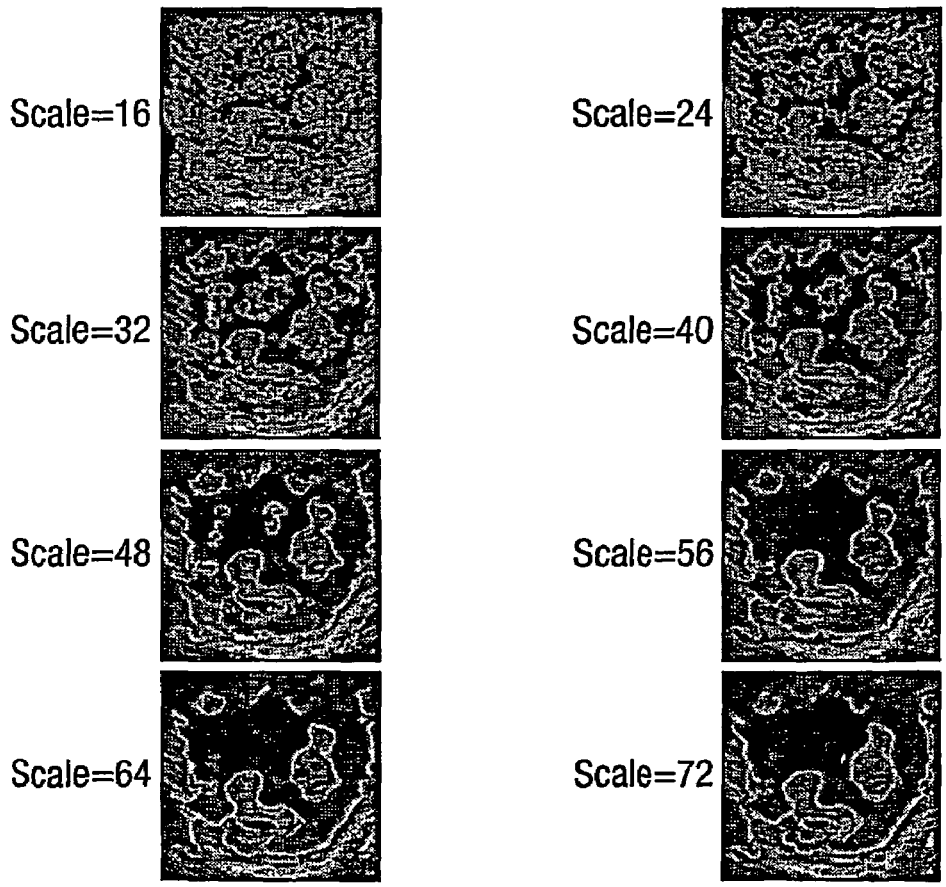
FIG. 8 illustrates the effect on feature detection of analysing the intensity profile using log-Gabor wavelets of different scale (wavelengths)

FIG. 8 illustrates the results of processing an echocardiogram of the left ventricle with the log-Gabor functions of FIG. 3 at a variety of scales from 16 pixels through to 72 pixels. The white overlay corresponds to detected step edges and marks those pixels with feature asymmetry values greater than the threshold 0.9. It can be seen that at the finest scale, for instance 16 pixels, most of the detected values correspond to the speckle texture in the ultrasound image. However, as the scale is increased it is the features of interest in the image which are detected, such as ventricular walls, for instance at 48 pixels scale. Thus for this image using a scale between 32 and 56 pixels would give satisfactory results. The actual scale to be used in any situation depends on the image (for instance the quality of the image acquisition and the imaging depth setting used by the sonographer), but the user can be given control of the scale giving the ability to tune or focus the detection to obtain good delineation of the desired features of interest.

Figure 6:
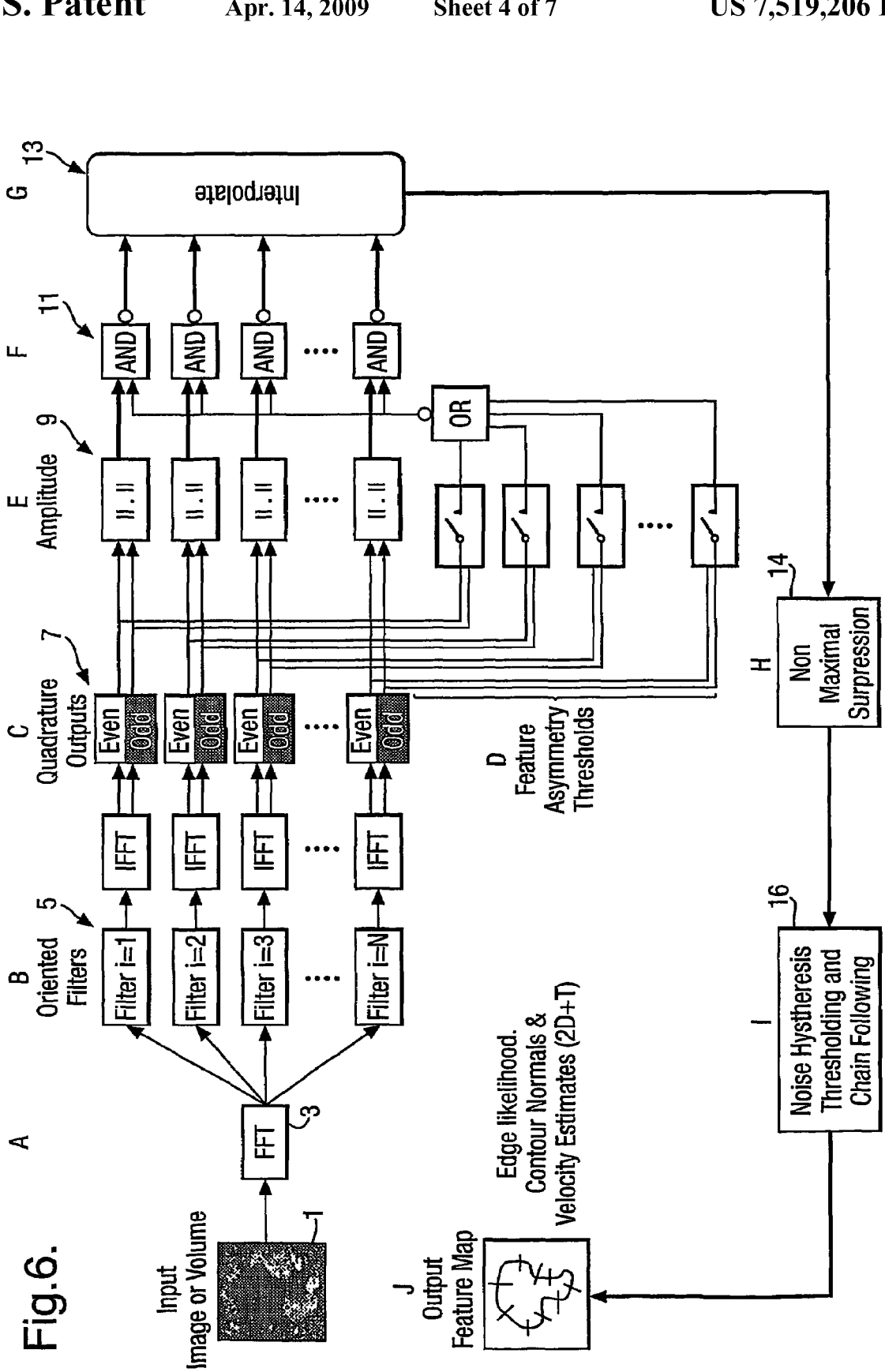
FIG. 6 schematically illustrates an image processing system according to an embodiment of the invention.
Figure 7B:
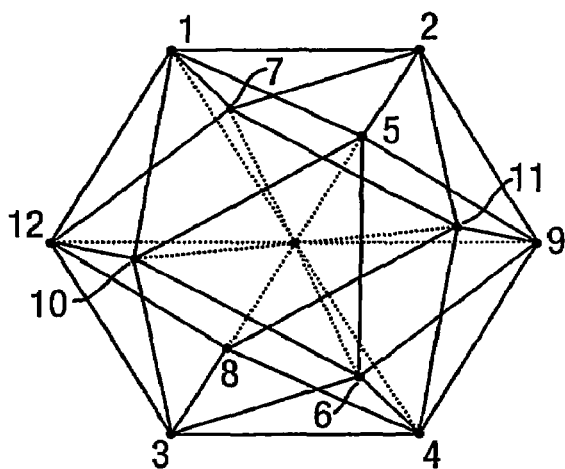

FIG. 6 is an example that illustrates schematically the image analysis processing of this embodiment. The data 1 (which can be an image or sequence of images) is input and Fourier transformed at 3 before being convolved with the series of oriented quadrature filters 5. The output of the quadrature filters 5 is then used to compute the feature shape measure, which in this embodiment is the feature asymmetry (which is a maximum for step edges). The feature asymmetry is derived from the even and odd filter outputs 7 using the formula above. The feature asymmetry is compared to a threshold (for instance 0.9) which is the only parameter used to accept image pixels as feature candidates via AND gates 11 for subsequent processing. For processing in two spatial dimensions three filters are required, for processing in 3D six filters are needed as shown in FIGS. 7(A) and (B). In FIG. 7(A) the orientations are directed to the vertices of a regular hexagon. In FIG. 7(B) the orientations are in the directions of the vertices of a regular icosahedron. For each of these candidate pixels an intensity-based measure, in this case the local amplitude as defined above, is computed at 9. Thus for each pixel accepted according to the feature asymmetry threshold, the local amplitude and feature asymmetry value from each of the oriented filters is recorded.

It will be appreciated that the value of the local amplitude from any of the filters depends on the relative orientation of the filter with respect to the feature. The maximum response is obtained when the filter is incident normal to the direction of the feature. Conversely, the minimum response is obtained when the filter is oriented parallel to the feature. In between, the local amplitude response decays smoothly and monotonically. This can be understood intuitively because the intensity profile along a line parallel to a step edge is constant, whereas the intensity profile along a line normal to the step edge gives the full step edge change. Thus the interpolator 13 determines the orientation of the feature from the local amplitude responses of the oriented filters 5. There are a variety of ways in which this can be done, such as a linear combination of the signals from the different orientations or by considering the outputs of the filters as vectors having a direction corresponding to the filter orientation and a length corresponding to the local amplitude, and fitting an ellipse to the end points of the vectors, the major axis of the fitted ellipse corresponding to the normal to the feature direction. The direction of the normal does not, of course, distinguish between positive and negative edges, but these are distinguishable by the sign of the odd filter output.

A non-maximum suppression algorithm 14 can be run on the results to narrow the detected edges to approximately pixel wide contour segments. Further, an intensity-related noise rejection, and preferably thresholding and chain following, stage 16 is used to avoid streaking and to enhance the continuity of the contour features. The result is the output at 18 of a series of connected points which are detected as belonging to an edge feature, with a probability proportional to their local amplitude and feature asymmetry scores, and labelled with an estimate of the feature orientation. In the case of sequences of images, an additional estimate of the feature plane with respect to the temporal axis gives an estimate of feature image velocity through the sequence.

Thus having detected pixels which belong to a particular type of image feature (i.e. a feature defined by a particular shape in the intensity profile), and having labelled those pixels with the local amplitude, feature asymmetry, orientation and optionally velocity, the system has provided a particularly rich description of the properties of the detected features. This rich description can be used to advantage in further processing of the image, particularly when compared with techniques which just mark a pixel as belonging to a detected feature or not. An example of such further processing will be described below, with reference to FIGS. 9 and 10.

Figure 9:
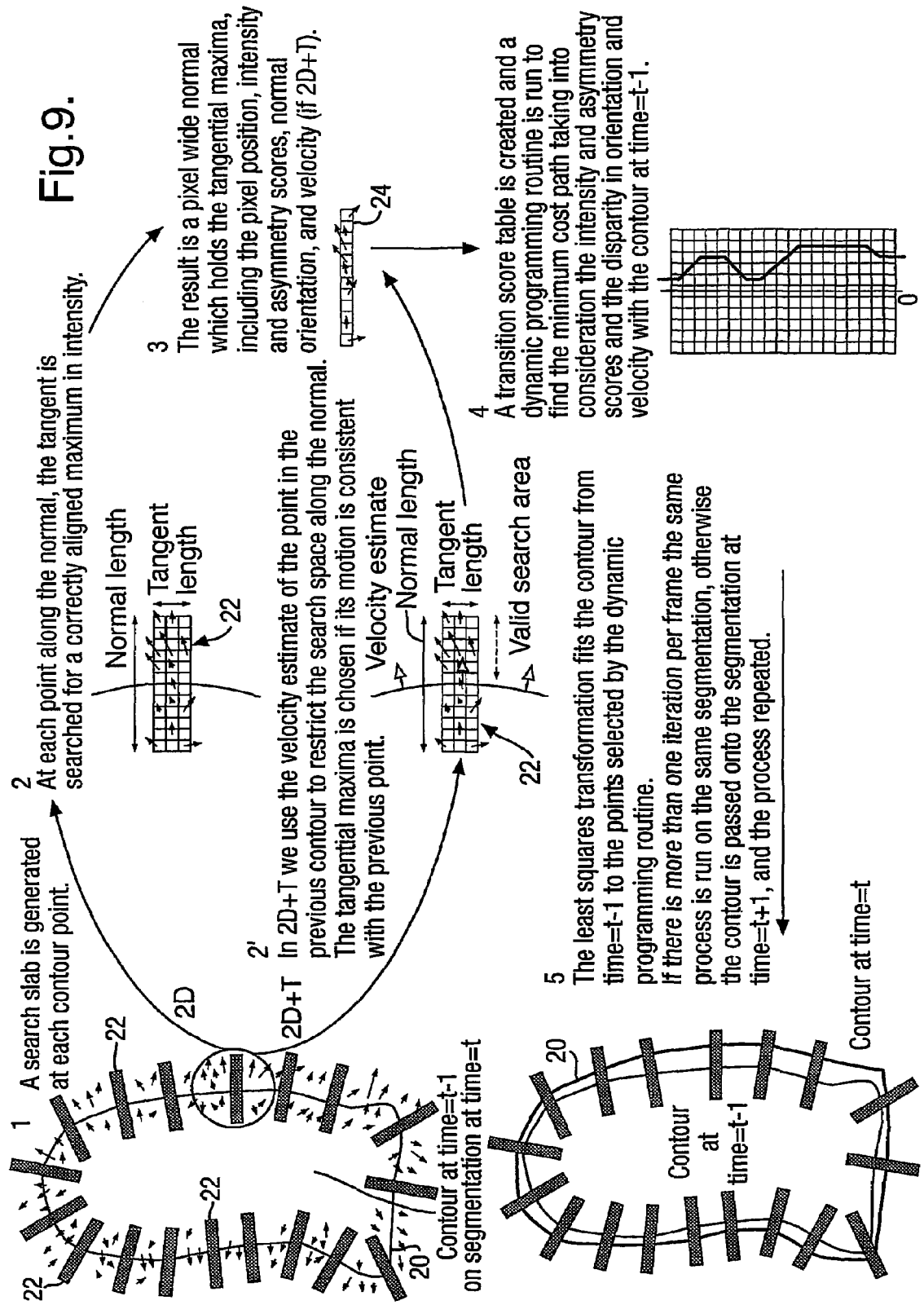
FIG. 9 illustrates a process for tracking a detected feature through a sequence of images.
Figure 10:
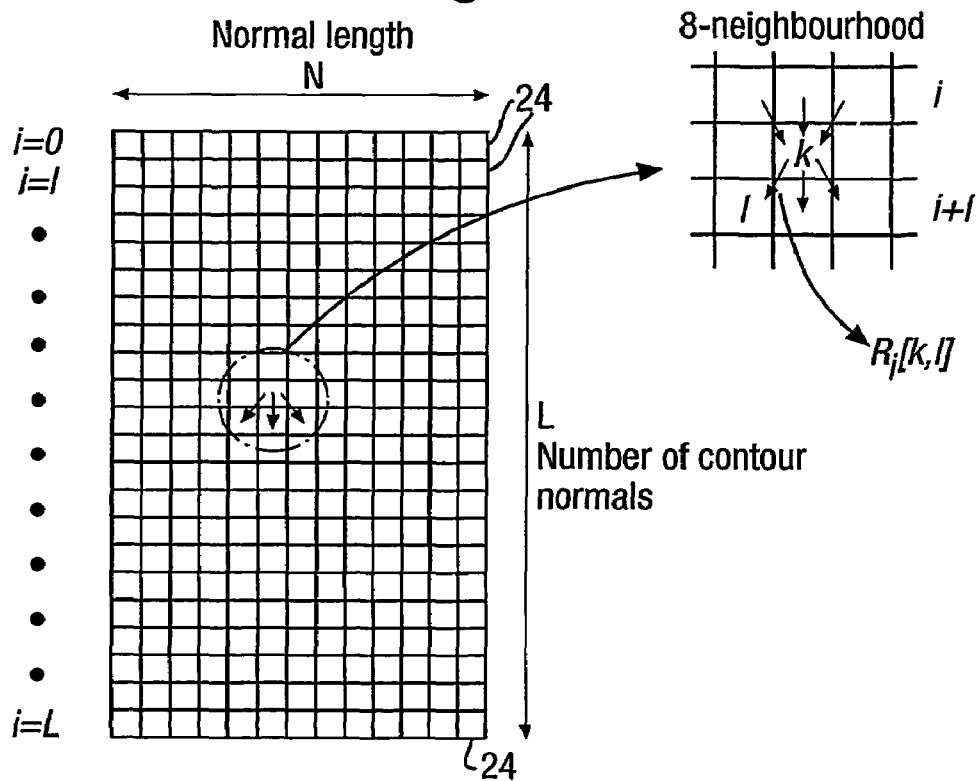
FIG. 10 schematically illustrates part of the tracking process.

In the particular application considered here, to echocardiographic images of the left ventricle, the feature being detected is the left ventricular wall (endocardium) which is a closed contour having a shape as illustrated at 20 in FIG. 9. As the heart beats the ventricle contracts as the ventricular wall moves and the contour detected in a sequence of images of the beating heart should follow the movement of the endocardium. While ideally it would be possible simply to detect the image features corresponding to the endocardium in each frame of the sequence, in practice noise and artifacts tend to produce a disconnected representation of the cardiac boundaries, and a number of spurious responses unrelated to the cardiac walls. Tracking the feature through a sequence of images can interpolate the features detected in the individual frames to produce a continuous contour which follows, or tracks, the feature in the image.

Various tracking techniques have been proposed, but tracking can be improved by using the rich description of the features provided by the detection technique above. This is illustrated in FIG. 9. Firstly, taking a contour 20 inherited from an adjacent time frame, a search slab 22 is projected inwardly and outwardly from each point on the contour. FIG. 9 illustrates an example in which these slabs are three pixels wide and twelve pixels long. Then each tangential row of three pixels within the slab is processed separately to find the strongest, local amplitude response of the three pixels, that agrees most closely with the orientation of the contour point 20 and has the highest feature asymmetry score. This is repeated for each row of three pixels in the slab. In this embodiment one of the three pixels was selected as a possible candidate if it has the strongest local amplitude response amongst the three and has a feature asymmetry score greater than 0.8 and if the difference in orientation between the contour normal and the feature normal is less than 5 degrees. Thus the candidates are selected making use of the labels attached during the feature detection process. It should be noted that the orientation measure takes into consideration the direction of the step edge (whether it is a positive or negative step).

It should be noted that in the case of processing an image in two spatial dimensions plus time, the velocity estimate for the points can be used to restrict the search space along the normal. Thus the length of the search slab is selected according to the velocity of the feature.

The result of this is a one-pixel-wide slab 24 normal to the contour which consists of that pixel (if any) from each of the tangential rows in the search slab which satisfies the search criteria.

The next step is to draw the new contour using the results of the one-pixel wide normals 24. In this embodiment this is achieved by a dynamic programming technique which finds the optimal path linking a single point from each of the normals 24, the optimal path being defined with reference to a cost function. The cost function defines each transition between candidate points from one normal 24 to the next as having a cost associated with it. Thus, referring to FIG. 10, the normals 24 are stacked next to each other and for a given pixel k in the ith row, the cost associated with a transition to the corresponding pixel in the next row or each of its neighbours is calculated.

The cost function is designed to blend the local amplitude values and orientation information and it includes partial costs such as:—a large penalty cost if an entry on the normal 24 has been left blank because no feature has been found in the image; the cost related to the local amplitude measurement, the distance away from the previous contour point and a smoothing term. The optimal path is the one that links one point from each normal such that the sum of all costs is minimal. A least squares transformation is then used to fit the contour inherited from the adjacent frame to the points selected by the dynamic programming routine.

Of course other techniques for tracking the contour can be used, but the aim is to improve the tracking process using the labels attached during the feature detection process.

We claim:
1. A method of detecting features-of interest in an image, comprising:
   using a processor to perform steps of:
   processing the image to make an intensity independent representation of an image intensity profile;
   comparing the intensity independent representation with an intensity independent shape model for predefined features of interest by:
      convolving the intensity independent representation with a quadrature filter to derive the phase and amplitude of a pair of odd and even components of the profile in the spatial or spatio temporal frequency domains;
      deriving from a difference between the components a measure of one of the feature symmetry or asymmetry along the profile,
      deriving from the components a measure of the local amplitude along the profile; and
      defining areas of the image satisfying a predefined constraint on the value of said one of the feature symmetry or asymmetry as satisfying the shape model and thus belonging to an image feature; and
      storing for the profile a label comprising said measures.

2. A method according to claim 1, wherein the label further comprises a measure of feature orientation.

3. A method according to claim 1, wherein the predefined features of interest comprise positive and negative step edges in the intensity profile.

4. A method according to claim 1, further comprising performing the comparing on intensity independent representations derived across successive frames of an image sequence to derive a measure of a velocity of image features moving through the sequence, and wherein said label further comprises said measure of the velocity.

5. A method according to claim 1, wherein said quadrature filter is a log-Gabor filter.

6. A method according to claim 1, wherein said predefined constraint on said one of the feature symmetry or asymmetry is that its magnitude is greater than or equal to a predefined threshold.

7. A method according to claim 1, further comprising convolving the intensity independent representation with quadrature filters oriented in different directions across the image to detect image features oriented differently in the image, and deriving from relative responses of the filters a measure of feature orientation.

8. A method according to claim 1, further comprising tracking detected image features through successive frames of an image sequence by comparing labels of areas in a succeeding frame with labels of areas in the preceding frame over a predetermined search region to define as relating to the same feature those areas in each frame whose labels satisfy predefined search criteria.

9. A method according to claim 8, wherein the predetermined search region is defined as a region within a predetermined distance of a position of the detected image feature in an adjacent frame in the sequence.

10. A method according to claim 9, wherein the predetermined distance is set in dependence upon a velocity of the detected image feature.

11. A method according to claim 8, wherein the predefined search criteria comprise a condition on a value of feature symmetry or asymmetry of the areas in the search region.

12. A method according to claim 11, wherein the condition on the value of the feature symmetry or symmetry or asymmetry is that it is greater than a predetermined amount.

13. A method according to claim 11, wherein the predefined search criteria comprise a condition that a difference in orientation of the detected features in the two frames is less than a predetermined amount.

14. A method according to claim 1, wherein the comparing is performed at a plurality of scales.

15. A method according to claim 1, wherein the comparing is performed on an intensity profile taken through a plurality of images of different depths of a volume being imaged.

16. A method according to claim 1, wherein the image is an ultrasound or magnetic resonance or x-ray or standard camera image.

17. A method according to claim 1, wherein the image is an ultrasound contrast image, an ultrasound Doppler image or an ultrasound harmonic image.

18. A method according to claim 1, wherein the image is a medical image.

19. A method according to claim 1, wherein the image is a remote sensing or non-invasive image.

20. A method according to claim 1, wherein the image is an echocardiogram.

21. A method according to claim 19, wherein the feature is a ventricular or atrial wall.

22. A computer program stored on a computer readable medium and comprising program code which is executable by a processor to perform a method of detecting features-of-interest in an image, the method comprising:

processing the image to make an intensity independent representation of an image intensity profile;

comparing the intensity independent representation with an intensity independent shape model for predefined features of interest by:

convolving the intensity independent representation with a quadrature filter to derive the phase and amplitude of a pair of odd and even components of the profile in the spatial or spatio temporal frequency domains;

deriving from a difference between the components a measure of one of the feature symmetry or asymmetry along the profile, deriving from the components a measure of the local amplitude along the profile; and defining areas of the image satisfying a predefined constraint on the value of said one of the feature symmetry or asymmetry as satisfying the shape model and thus belonging to an image feature; and storing for the profile a label comprising said measures.

23. An image processing system comprising a processor and a computer-readable medium storing a program which, when executed by the processor, performs the method of claim 1.

* * * * *